US008746621B2

(12) United States Patent
Cabanac et al.

(10) Patent No.: US 8,746,621 B2
(45) Date of Patent: Jun. 10, 2014

(54) CONNECTOR FOR STIFFENING FRAMES BETWEEN AN AIRCRAFT FUSELAGE AND A WING BOX

(75) Inventors: Jean Pierre Cabanac, Tournefeuille (FR); Jerome Colmagro, Toulouse (FR); Jean Marc Durand, Levignac (FR); Ludovic Fournie, Toulouse (FR); Julien Guillemaut, Madrid (ES); Francois Loyant, L'isle Jourdain (FR)

(73) Assignee: AIRBUS Operations S.A.S., Toulouse (FR)

( * ) Notice: Subject to any disclaimer, the term of this patent is extended or adjusted under 35 U.S.C. 154(b) by 37 days.

(21) Appl. No.: 13/348,110

(22) Filed: Jan. 11, 2012

(65) Prior Publication Data

US 2012/0193475 A1 Aug. 2, 2012

(30) Foreign Application Priority Data

Jan. 28, 2011 (FR) ..................................... 11 50678

(51) Int. Cl.
*B64C 1/06* (2006.01)

(52) U.S. Cl.
USPC .......................................... 244/131; 244/119

(58) Field of Classification Search
USPC ........ 244/123.7, 119, 131, 132, 123.1, 123.8, 244/120, 117 R
See application file for complete search history.

(56) References Cited

U.S. PATENT DOCUMENTS

| | | | | |
|---|---|---|---|---|
| 5,518,208 | A * | 5/1996 | Roseburg | 244/132 |
| 7,159,822 | B2 * | 1/2007 | Grantham et al. | 244/119 |
| 7,555,873 | B2 * | 7/2009 | Kilwin et al. | 52/838 |
| 7,823,362 | B2 * | 11/2010 | Meyer | 52/713 |
| 8,016,236 | B2 * | 9/2011 | Grieve et al. | 244/131 |
| 8,302,909 | B2 * | 11/2012 | Cazeneuve et al. | 244/120 |
| 2006/0018710 | A1 | 1/2006 | Durand et al. | |
| 2006/0060705 | A1 * | 3/2006 | Stulc et al. | 244/119 |
| 2010/0170987 | A1 | 7/2010 | Meyer | |
| 2010/0258676 | A1 * | 10/2010 | Gauthie et al. | 244/131 |
| 2011/0147521 | A1 | 6/2011 | Delahaye et al. | |

FOREIGN PATENT DOCUMENTS

| | | | |
|---|---|---|---|
| FR | 2 873 347 | A1 | 1/2006 |
| FR | 2 936 489 | A1 | 4/2010 |
| FR | 2 948 099 | A1 | 1/2011 |

OTHER PUBLICATIONS

French Search Report issued Oct. 7, 2011, in Patent Application No. FR 1150678.

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

The stiffening frames (14) of an aircraft fuselage (2) remain continuous while passing through an upper panel (5) of the wing box and extend over the ribs (3) situated in that box. The overall mechanical strength of the assembly is improved, despite the notches it is necessary to make in the panel (5).

9 Claims, 4 Drawing Sheets

4 2 6 8 5 1 7 3

CONNECTOR FOR STIFFENING FRAMES BETWEEN AN AIRCRAFT FUSELAGE AND A WING BOX

TECHNICAL FIELD

The invention relates to the connection of stiffening frames between a fuselage and a wing box of an aircraft.

Aircraft fuselages are provided with so-called smooth longitudinal stiffeners and so-called frame circumferential stiffeners extending over transverse sections of the aircraft. The stiffeners and the fuselage itself are, however, interrupted at the location of the connection to the wing box, where a connecting piece with a cross-shaped section is generally located attaching an extrados (upper) panel of the wing of the airfoil and an upper panel of the wing box that are extended, and on the other hand the fuselage and a rib of the wing box that are also extended. Since the rib must be stiffened like the fuselage, a traditional design consists of assigning it stiffeners, some of which extend the frames and are called inner frame lower sections. Furthermore, the inner frame lower sections ensure the continuity of the force path, using splice plates called outer frame lower sections and which are secured on the one hand to the frames by shearing bolts, and on the other hand to the inner frame lower sections by tension bolts passing all the way through the wing box panel and the connecting piece. A similar design, but applied to the stiffening between the upper wing panel and the upper box panel, is described completely in document FR-A-2 873 337.

The frames of the fuselage are subject to various stresses (normal pulling or compression forces combined with bending forces) coming mainly from the forces applied to the airfoil as well as the pressurization forces applied to the fuselage. The junction area between the frames and the frame lower sections (inner and outer) is often sized in fatigue.

The risks of the junction between the frames and the outer frame lower sections breaking due to fatigue cannot not be ruled out in practice, even when one is careful to use frame lower sections with a favorable shape, without irregularities such as sharp angles or significant thickness changes, any more than by bringing the junction fasteners between frames and frame lower sections closer to the neutral axis of the frames. While design improvements in the outer frame lower sections and the position of the shearing bolts have been proposed to reduce these drawbacks, the connection of the fuselage to the rib remains complicated and potentially critical in fatigue.

In a general form, the invention relates to an aircraft structure comprising a fuselage, a rib extending the fuselage and belonging to a wing box, an upper panel of the wing box connected to the fuselage and the rib, and stiffening frames of the fuselage each extending in a transverse section of the aircraft, characterized in that the frames extend continuously through notches in the wing box panel and comprise lower ends that stiffen the rib.

By becoming continuous, the frames make it possible to avoid the use of outer frame lower sections and the associated mechanical fragility. It should be noted that the wing box panel must then be notched to allow the cross-section of the frames to pass, but this weakening is acceptable, the loss of stiffness of the panel being relatively unimportant in light of the transverse or vertical forces preferably exerted thereon.

The loss of stiffness would be much more detrimental if longitudinal notches were to be pierced through the panel. However, traditional frames generally comprise heel parts positioned at their free ends, and intended to increase their stiffness and which are perpendicular to their cores, i.e. oriented in a longitudinal direction. It is then recommended, according to the invention, for the panel not to be notched at the location of the heels, but for the latter parts to be interrupted before passing through the panel. The decreased stiffness is therefore passed onto the frames rather than the panel, which is considered to be more acceptable for the proper strength of the structure.

Another aspect of the invention comprises fittings pressed on the panel and the frames, covering the notches so as to reestablish the sealing through the panel. The fittings can be angles, of which there are four for each of the notches, which each comprise a wing secured to the panel and a wing secured to the frame.

It is then recommended for the fittings to contribute to reestablishing the stiffness of the frames by supplying heels to the portions where they are interrupted, which corresponds precisely to the location of the fittings. In a first embodiment, the fittings comprise, aside from a main portion extending along the notch, a branch rising along the frame as far as the heel; this branch is then secured to the frame. In another embodiment, splice plates are secured to the fittings and to the frames, and extend over the frames as far as the heels; and according to a third embodiment slightly different from the previous one, the splice plates comprise two ribs attached to one another and perpendicular to one another, the ribs respectively being secured to one of the fittings and one of the heels.

The invention also relates to an aircraft provided with a structure according to the preceding.

The invention will now be described in detail, but solely as an illustration in reference to the figures, in which.

Figure 1:
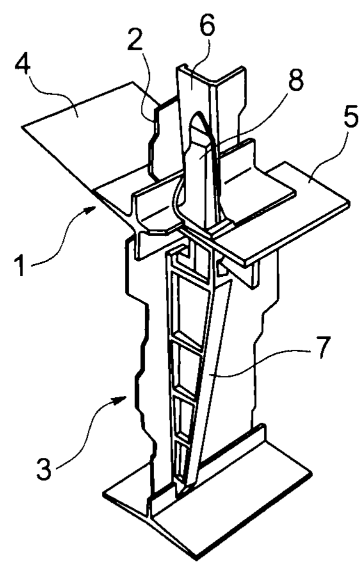
FIG. 1 shows a known frame arrangement with an outer frame lower section and an inner frame lower section.
Figure 2:
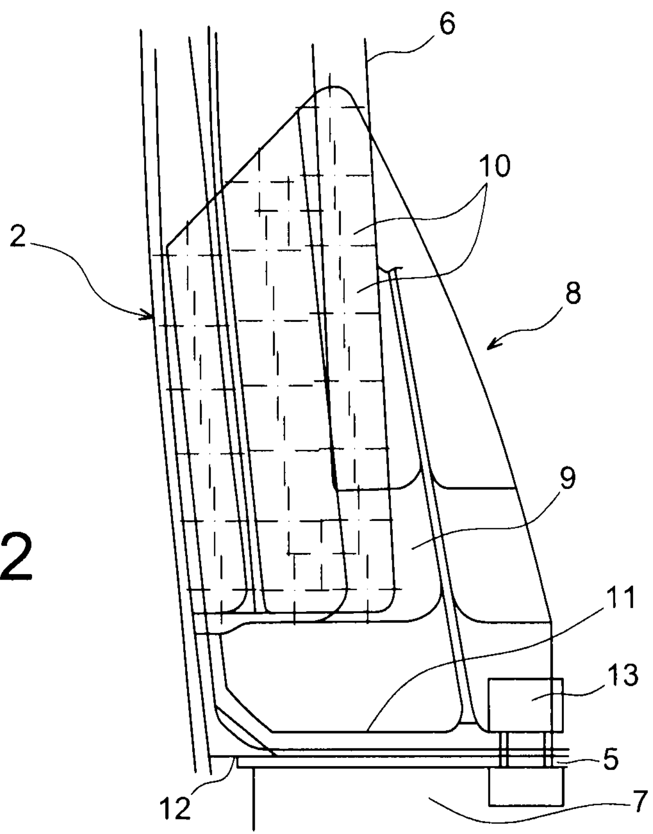
FIG. 2 shows the outer frame lower section of FIG. 1.

FIG. 1 shows a traditional design for the arrangement of the lower part of the frames. A cross-shaped connector (1) is placed with its back against a fuselage panel (2) by its upper wing, with a wing box rib (3) by its lower wing, with an airfoil panel (4) by a horizontal wing, and with a wing box panel (5) (on the upper surface of the box) by an opposite horizontal wing (12). Frames (6) stiffening the fuselage (2) are interrupted relatively close to the connector (1). Inner frame lower sections (7) extending the frame (6) stiffen the rib (3) of the other side of the central box panel (5). Splice plates called outer frame lower sections (8), shown in more detail in FIG. 2, ensure continuity between the frames (6) and the inner frame lower sections (7). The outer frame lower sections (8) comprise a flat core (9) pressed on the frame (6) with which they are associated, and which is secured to them by shearing bolts (10). They also comprise a base (11) pressed on the wing (12) of the connector (1) and which is provided with holes intended for the passage of tension bolts (13) connecting them to the lower frame bottom sections (7) through the panel (5). As mentioned, the outer frame lower sections (8) are subject to stress concentrations that make them vulnerable to fatigue, and the shearing bolts (10), often remote from the neutral bending line of the frames (6), are also vulnerable.

Figure 3:
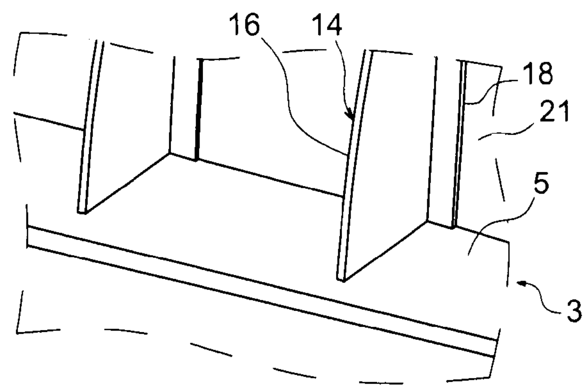
FIG. 3 shows the characteristic arrangement of the invention.
Figure 4:
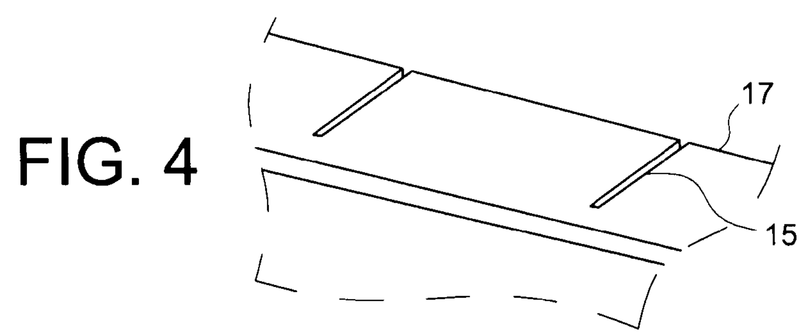
FIG. 4 shows the notched panel alone.
Figure 5:
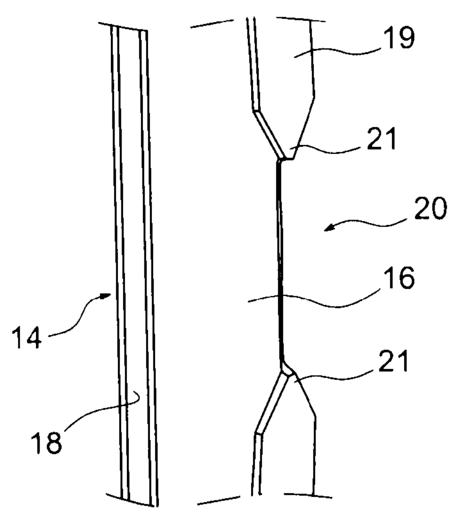
FIG. 5 shows the frame.

We will now describe the invention, and first FIGS. 3, 4 and 5.

The frames, now (14), pass through the wing box panel (5), which has been provided with notches (15), oriented in the transverse direction of the aircraft to allow the cores (16) of the frames (14) oriented in that same direction to pass, as well as notch heels (17) established on the edge of the wing box panel (5), attached to the notches (15) and extending in an axial direction of the aircraft, which are intended to free the passage for the base plates (18) of the frames (14). Neither the notches (15) nor the notch heels (17) greatly weaken the panel (5), which is essentially subjected to forces in the vertical and transverse directions. The traditional connector (1) with a cross-shaped cross-section could be kept on the condition that it is also passed through by similar notches. It could also be divided into sections extending between two frames (14). And although it is used traditionally, it is not crucial and can be eliminated, the fuselage (2) and the rib (3) then being in a single piece and the airfoil and wing box panels (4 and 5) being secured directly to the extended rib thus formed.

The frames (14) are advantageously provided with a heel (19) at their free end, opposite the base plate (18), to increase their stiffness. It would, however, be disadvantageous to provide the wing box panel (5) with notches corresponding to their location; heel stops (20) are rather formed at the location of the wing box panel (5), and, when it exists, the wing (12). The junction between the heels (19) and the heel stops (20) is done by beveled edges (21) thinning down toward the heel stops (20) gradually around cores (7), which further reduces the stress concentrations.

Figure 6:
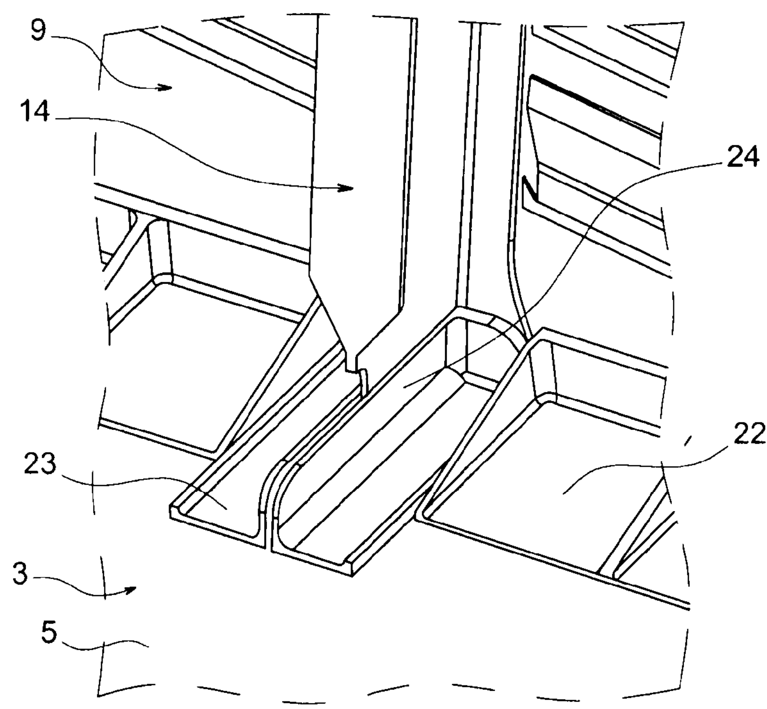
FIG. 6 shows the fittings that complete the structure.
Figure 7:
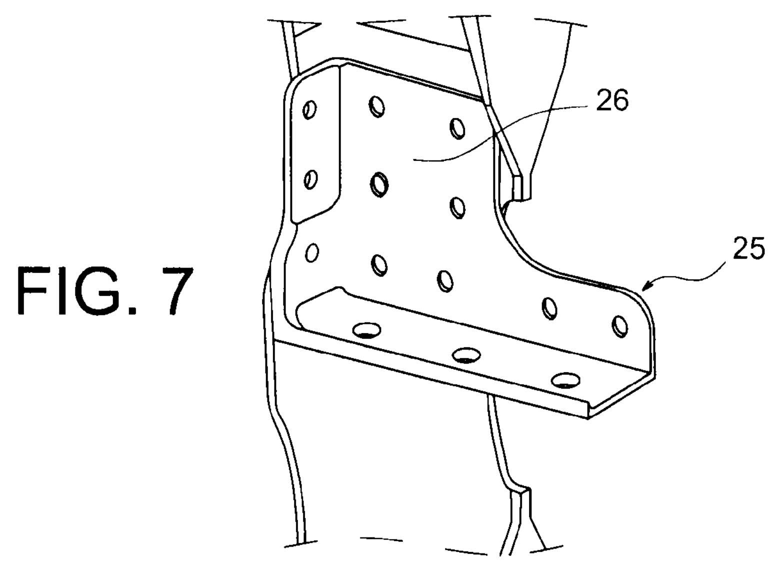
FIGS. 7, 8 and 9 show three improved embodiments of the fittings.
Figure 8:
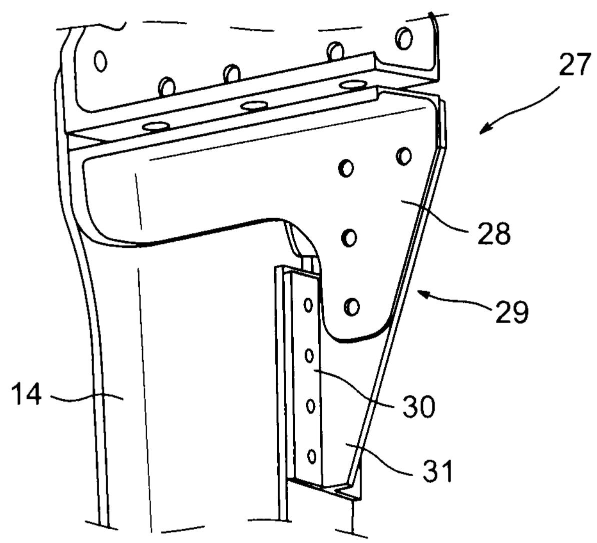
Figure 9:
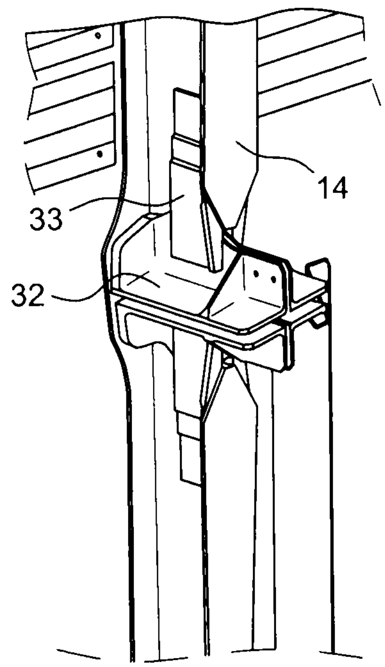

We will now refer to FIG. 6. Fittings (22, 23) are positioned at the junction of the fuselage (9) and the rib (3) on either side of the wing box panel (5), on the side of the frames (14) as shown and also on the other side, to enable the transmission of forces between the central wing box (5) and airfoil (4) panels through bolted connections (not shown) joining the opposite fittings through the fuselage (2) and the rib (3). Most of the fittings (22) extend between two consecutive frames (14); the other fittings, which extend in front of the frames (14), are angles (23), of which there are four for each of the frame intersections (14), each comprising a vertical wing (24) pressing on the core (16) of the frame (14) and a horizontal wing (25) pressing on the wing box panel (5). The angles (23) are bolted to one another through the core (16) and the wing box panel (5). They have the particular role of covering the notches (15 and 17) to produce sealing, but they can also contribute to strengthening the frames (14). Several embodiments offering this advantage are given in FIGS. 7, 8 and 9. In the first, the angles, now (25), comprise, aside from a main part similar to the angles (23), a rising branch (26) pressing on the core of the frame (14) and bolted thereto, as well as the base plate (18), and extends up to the heel (19), which adds to the interruption thereof. In the embodiment of FIG. 8, the angles, now (27), comprise, aside from a main part here that is also similar to the angles (23), an end (28) protruding in the vertical direction, and the embodiment also comprises a splice plate (29) comprising a base (30) pressed on the heel of the frame (14) and a rib (31) pressed on the projection (28). Bolts (not shown) fasten the base (30) to the heel and the rib (31) to the projection (28). The forces passing through the heel (19) can therefore, to a certain extent, pass through the heel stops (20) by passing through the splice plates (29) and the angles (28) on both sides of the wing box panel (5). In the embodiment of FIG. 9, the angles (32) are similar to the angles (23) of the first embodiment, but splice plates, now (33), extend from the vertical wings of those angles (32) to portions of the core (16) of the frames (14) that are situated beyond the heel edges (20), extending along the core (16). The splice plates (33) are secured to the vertical wing of the angle (32) and the core of the frame (14).

The invention claimed is:

1. An aircraft structure, comprising:

a fuselage a rib extending the fuselage and belonging to a wing box;

an upper panel of the wing box connected to the fuselage and the rib; and stiffening frames of the fuselage extending in a transverse section of the aircraft between a lower end and an upper end of the stiffening frame, each stiffening frame including:

a core extending between the lower end and the upper end of the stiffening frame, heels at a free end of the stiffening frame, wherein the heels are perpendicular to the core, and a base plate at an end opposite to the free end of the stiffening frame, wherein at least the cores of the stiffening frames contact notches in the wing box panel, and extend continuously through the notches, wherein the lower end of the stiffening frames stiffen the rib, and wherein the wing box panel comprises first notches oriented toward the transverse sections of the aircraft to allow the cores of the frames to pass, and second notches oriented in an axial direction of the aircraft to free the passage for base plates of the frames bearing on the fuselage and the rib.

2. The aircraft structure according to claim 1, wherein the frames comprise heels at free ends of the cores, which are provided with interruptions through the wing box panel.

3. The aircraft structure according to claim 2, wherein the heels are attached to the heel stops by ends that gradually become thinner.

4. The aircraft structure according to any one of claim 1, 2 or 3, further comprising fittings pressed on the wing box panel and on the frames while covering the notches.

5. The aircraft structure according to claim 4, wherein the fittings are angles, of which there are four for each of the frames, said angles each comprising a wing secured to the wing box panel and a wing secured to the frame.

6. The aircraft structure according to claim 4, wherein the fittings comprise a main portion covering the notches, and a branch rising along the frame as far as the heel and secured to the frame.

7. The aircraft structure according to claim 4, further comprising splice plates including a base and a rib attached to one another and perpendicular to one another, the bases being secured to the heels and the ribs to protruding ends of the fittings.

8. The aircraft structure according claim 4, further comprising splice plates secured to the fittings and to the frames, and extending over the frames as far as the heels.

9. An aircraft provided with a structure according to claim 1.

* * * * *